US011505129B2

(12) United States Patent
Kim et al.

(10) Patent No.: US 11,505,129 B2
(45) Date of Patent: Nov. 22, 2022

(54) CARGO BED ASSEMBLY FOR PICKUP TRUCK

(71) Applicants: HYUNDAI MOTOR COMPANY, Seoul (KR); KIA MOTORS CORPORATION, Seoul (KR)

(72) Inventors: Un Tae Kim, Gwangmyeong-si (KR); Han Jun Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 213 days.

(21) Appl. No.: 17/087,424

(22) Filed: Nov. 2, 2020

(65) Prior Publication Data
US 2022/0009417 A1    Jan. 13, 2022

(30) Foreign Application Priority Data
Jul. 7, 2020 (KR) .................. 10-2020-0083160

(51) Int. Cl.
*B60R 3/02* (2006.01)
*B62D 33/027* (2006.01)
(52) U.S. Cl.
CPC ............ *B60R 3/02* (2013.01); *B62D 33/0273* (2013.01)
(58) Field of Classification Search
CPC ............................... B60R 3/02; B62D 33/0273
See application file for complete search history.

(56) References Cited

U.S. PATENT DOCUMENTS

| 6,905,158 | B1 * | 6/2005 | Bastian .............. B62D 33/0273 |
| | | | 296/62 |
| 7,712,811 | B2 * | 5/2010 | Heaman .............. B62D 33/0273 |
| | | | 296/62 |
| 8,511,734 | B2 * | 8/2013 | Hutchins, Jr. ........... B60P 1/435 |
| | | | 296/61 |
| 9,315,145 | B2 | 4/2016 | Salter et al. |
| 9,517,711 | B2 | 12/2016 | Krajenke et al. |
| 10,017,092 | B1 * | 7/2018 | Chastain, Jr. ........... B60P 1/433 |
| 10,106,208 | B2 * | 10/2018 | Barrios Albert .......... B60R 3/02 |
| 10,183,623 | B2 | 1/2019 | Krishnan et al. |
| 2014/0377046 | A1 * | 12/2014 | Aiello ..................... B60P 1/431 |
| | | | 414/537 |

* cited by examiner

Primary Examiner — D Glenn Dayoan
Assistant Examiner — Melissa Ann Bonifazi
(74) Attorney, Agent, or Firm — Lempia Summerfield Katz LLC

(57) ABSTRACT

A cargo bed assembly for a pickup truck includes: a pair of side walls opposing each other; a truck bed located between the pair of sidewalls, and having a first cavity; a tailgate pivotally connected to a rear end of the truck bed by a first pivot pin, and having a second cavity; a slide unit movably received in the first cavity; and a step unit movably received in the second cavity. In particular, the second cavity is configured to communicate with the first cavity, and the step unit is pivotally connected to the slide unit.

15 Claims, 16 Drawing Sheets

CARGO BED ASSEMBLY FOR PICKUP TRUCK

CROSS-REFERENCE TO RELATED APPLICATION

This application claims priority to and the benefit of Korean Patent Application No. 10-2020-0083160, filed on Jul. 7, 2020, the entire contents of which is incorporated herein by reference.

FIELD

The present disclosure relates to a cargo bed assembly for a pickup truck, and more particularly, to a cargo bed assembly for a pickup truck capable of facilitating the ingress and egress of passengers, cargo, etc.

BACKGROUND

The statements in this section merely provide background information related to the present disclosure and may not constitute prior art.

A pickup truck includes a truck cabin and a cargo bed assembly located behind the truck cabin. The cargo bed assembly has a cargo compartment that accommodates passengers, small cargo, and large cargo such as motorcycles. The cargo bed assembly includes a step that assists in the operator's work with ingress and egress, and the step is stowed in a cavity of a tailgate and deployed from the cavity of the tailgate.

However, most of the existing cargo bed assemblies do not have a structure for assisting in loading and unloading of large cargo such as motorcycles, making the ingress and egress of large cargo relatively difficult.

In addition, some cargo bed assemblies have a foldable slope which is stowed in the cavity of the tailgate and deployed from the cavity of the tailgate. However, as the foldable slope is stowed in the cavity of the tailgate, the thickness of the tailgate may be excessively increased, which increases the manufacturing cost and weight of the cargo bed assembly.

The above information described in this background section is provided to assist in understanding the background of the inventive concept, and may include any technical concept which is not considered as the prior art that is already known to those skilled in the art.

SUMMARY

An aspect of the present disclosure provides a cargo bed assembly for a pickup truck capable of facilitating the ingress and egress of passengers, cargo, etc.

According to an aspect of the present disclosure, a cargo bed assembly for a pickup truck may include: a pair of side walls opposing each other; a truck bed located between the pair of sidewalls, and having a first cavity; a tailgate pivotally connected to a rear end of the truck bed by a first pivot pin, and having a second cavity; a slide unit movably received in the first cavity; and a step unit movably received in the second cavity. The second cavity may communicate with the first cavity, and the step unit may be pivotally connected to the slide unit.

The slide unit may include a slide plate having a front end facing the front of the pickup truck and a rear end facing the rear of the pickup truck, and a support plate pivotally connected to the front end of the slide plate by a second pivot pin.

The slide plate may move between a stowed position in which the slide plate is stowed in the first cavity and an extended position in which the slide plate is extended from the first cavity and the second cavity.

The support plate may be held in the tailgate by a pair of hold mechanisms when the slide plate is fully extended from the first cavity and the second cavity.

The support plate may include a pair of accommodation recesses provided in both opposing sides thereof, and each hold mechanism may be received in a corresponding accommodation recess.

The hold mechanism may include a hold member pivotally mounted in the corresponding accommodation recess and a spring biasing the hold member outward from the support plate.

The tailgate may have a pair of hold recesses provided in both opposing sides of the second cavity, respectively, and the hold member may be fitted into a corresponding hold recess by the spring.

The step unit may move between a stowed position in which the step unit is stowed in the second cavity and an extended position in which the step unit is fully extended from the second cavity.

The step unit may include a step support pivotally connected to the rear end of the slide plate by a third pivot pin, and a step member pivotally connected to the step support.

The step support may include a pair of support legs spaced apart from each other, and the pair of support legs may extend from the step support.

The step member may be pivotally connected to the pair of support legs by a fourth pivot pin. As the step member pivots, the step member may move between a folded position in which the step member is folded to the step support and an unfolded position in which the step member is unfolded from the step support.

The step member may have a first end portion close to the fourth pivot pin and a second end portion relatively far from the fourth pivot pin, the first end portion may have a grip recess, a pair of support protrusions may be provided on opposing edges of the first end portion, and each support protrusion may have a stopper surface regulating the unfolded position of the step member.

The step support may have a recess located between the pair of support legs, the second end portion may have a protrusion, and the protrusion of the second end portion may be received in the recess of the step support when the step member is in the folded position.

The tailgate may include a first opening and a second opening communicating with the second cavity, the first opening and the second opening may be provided in both opposing ends of the second cavity, respectively, the first opening may face the first cavity, the second opening may face the outside of the pickup truck, and a first cover may be pivotally mounted to the second opening.

The tailgate may further include a third opening adjacent to the second opening, and a second cover may be pivotally mounted to the third opening.

DRAWINGS

In order that the disclosure may be well understood, there will now be described various forms thereof, given by way of example, reference being made to the accompanying drawings, in which.

Figure 1:
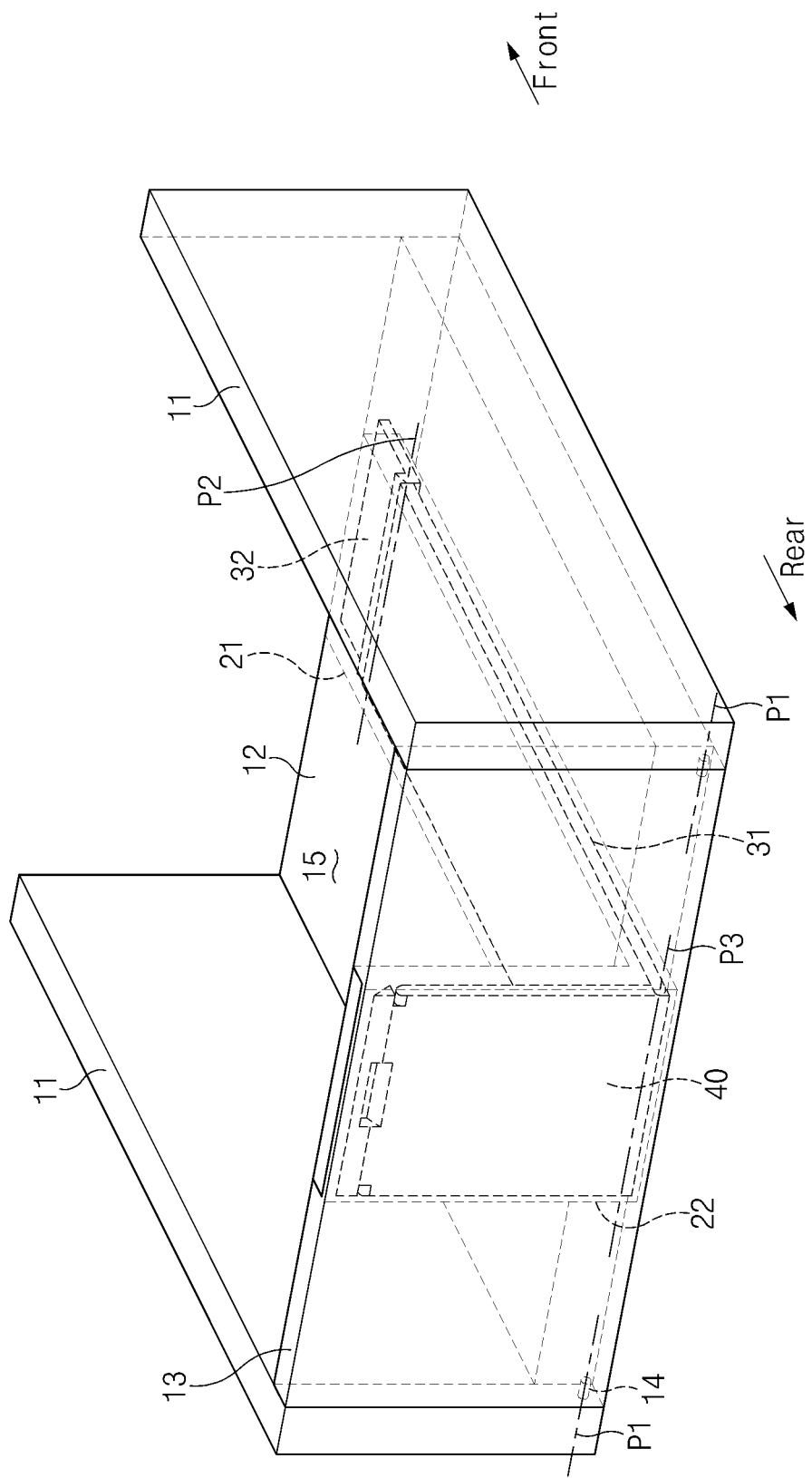
FIG. 1 illustrates a perspective view of a cargo bed assembly for a pickup truck in one form of the present disclosure.

The statements in this section merely provide background information related to the present disclosure and may not constitute prior art.

DETAILED DESCRIPTION

The statements in this section merely provide background information related to the present disclosure and may not constitute prior art.

Hereinafter, various forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
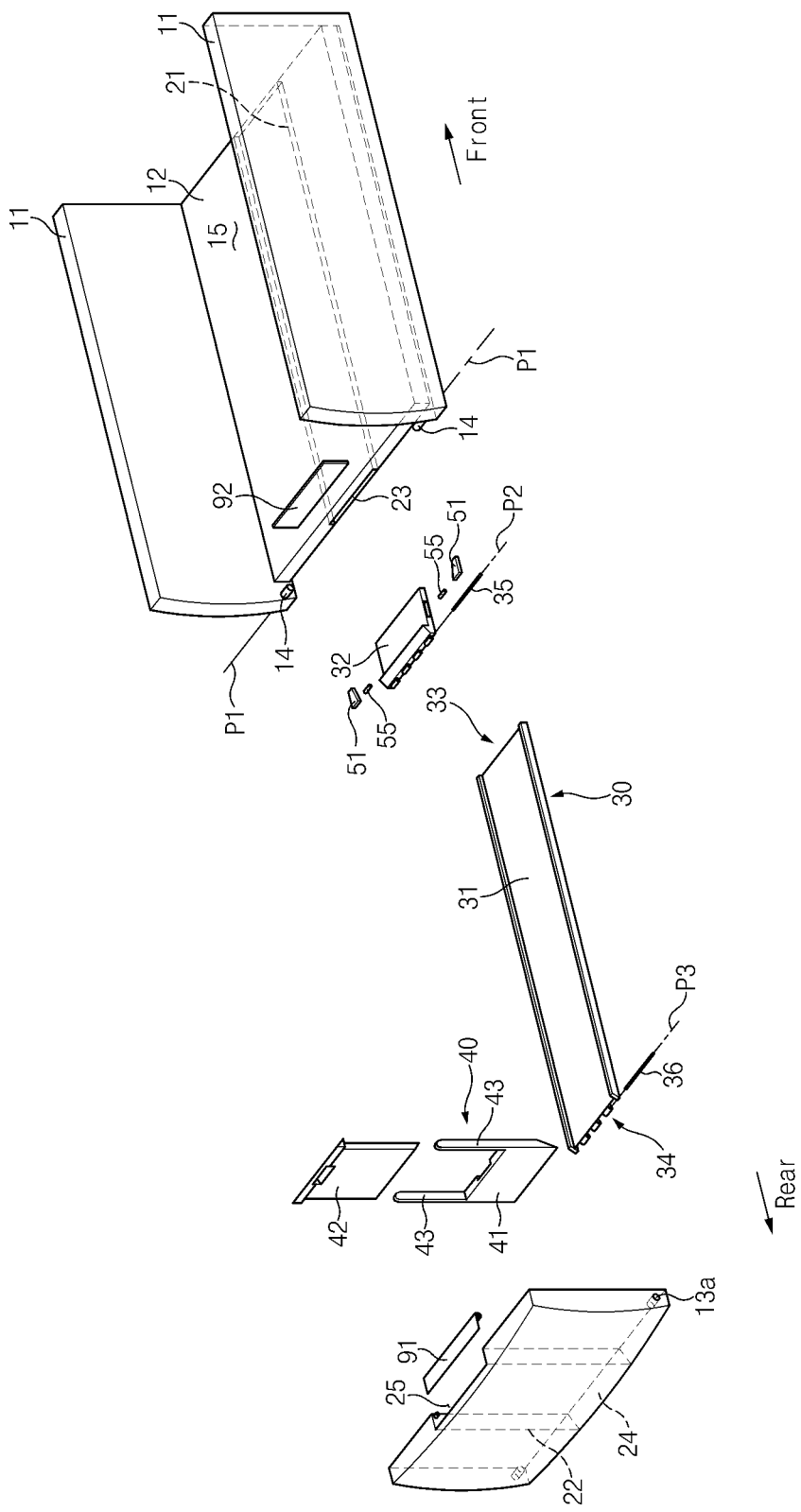
FIG. 2 illustrates an exploded perspective view of a cargo bed assembly for a pickup truck in one form of the present disclosure.
Figure 3:
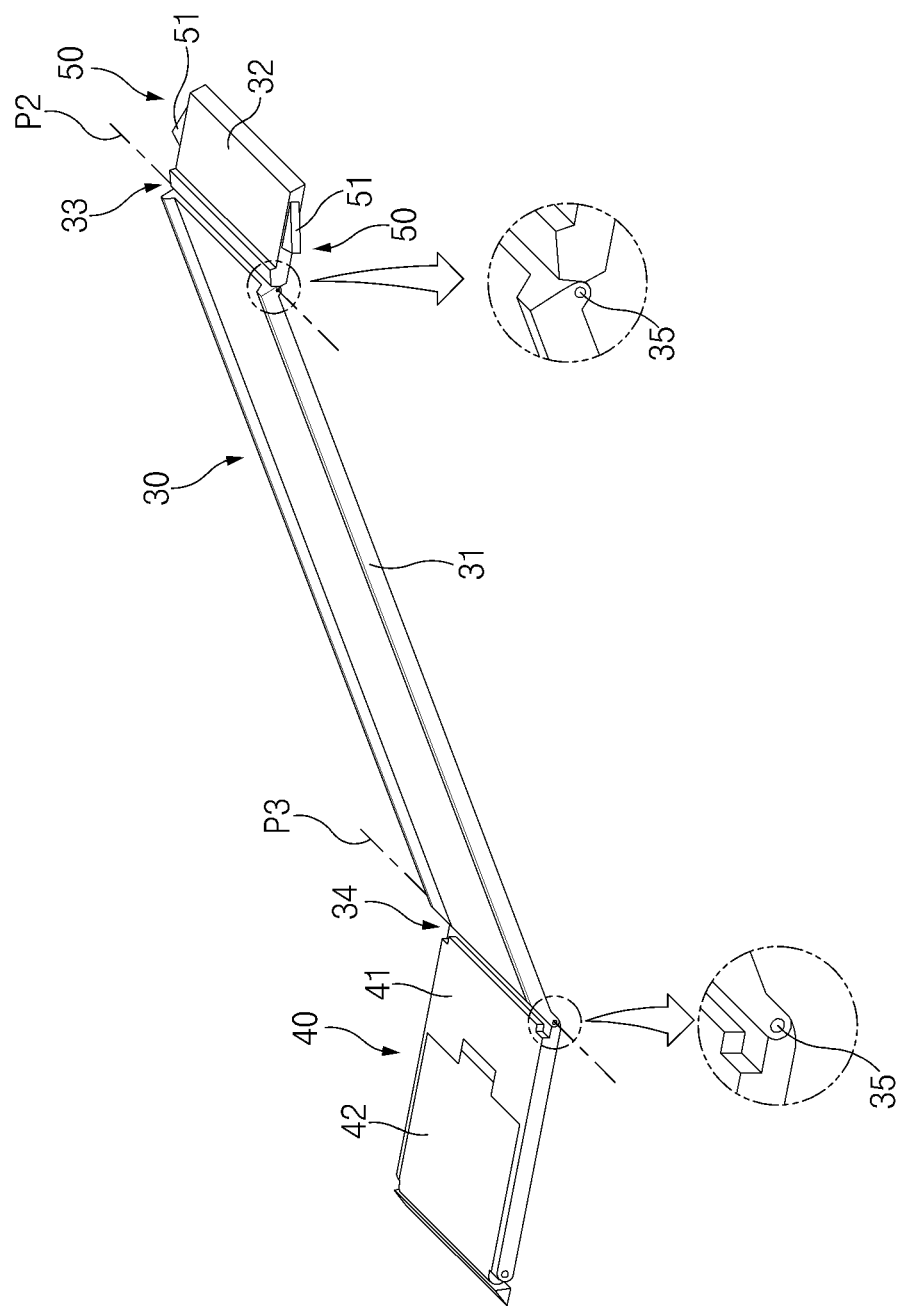
FIG. 3 illustrates a perspective view of a slide unit and a step unit in a cargo bed assembly for a pickup truck in one form of the present disclosure.

Referring to FIGS. 1 to 3, a cargo bed assembly 10 for a pickup truck in one form of the present disclosure may include a pair of sidewalls 11 opposing each other, a truck bed 12 located between the pair of sidewalls 11, and a tailgate 13 pivotally connected to a rear end of the truck bed 12.

The cargo bed assembly 10 may have a cargo compartment 15 defined by the pair of sidewalls 11 and the truck bed 12.

Figure 6:
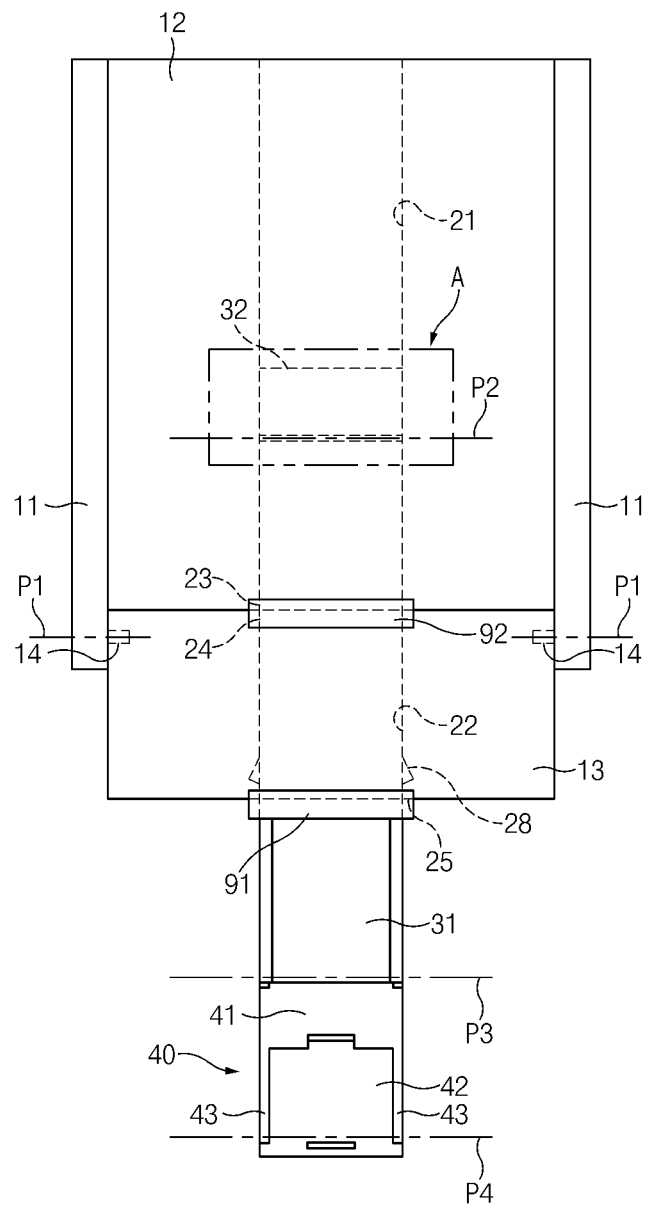
FIG. 6 illustrates a state in which a slide plate is partially extended from a second cavity of a tailgate in a cargo bed assembly for a pickup truck in one form of the present disclosure.

The cargo bed assembly 10 may be located behind a cabin (not shown) of the pickup truck, and the truck bed 12 may be flat. Referring to FIGS. 2 and 6, the truck bed 12 may have a first cavity 21 and an opening 23 communicating with the first cavity 21. The first cavity 21 may extend in a longitudinal direction of the truck bed 12, and the opening 23 may face the tailgate 13.

The tailgate 13 may include a second cavity 22, and a first opening 24 and a second opening 25 communicating with the second cavity 22. Referring to FIGS. 2 and 6, the second cavity 22 may extend in a longitudinal direction of the tailgate 13, and the first opening 24 and the second opening 25 may be formed in both opposing ends of the second cavity 22, respectively. The first opening 24 may face the opening 23 of the first cavity 21, and the second opening 25 may face the outside of the pickup truck. The first cavity 21 of the truck bed 12 may communicate with the second cavity 22 of the tailgate 13 through the opening 23 of the truck bed 12 and the first opening 24 of the tailgate 13, and the second cavity 22 of the tailgate 13 may communicate with the outside of the pickup truck through the second opening 25.

The tailgate 13 may be pivotally connected to the rear end of the truck bed 12 through a pair of first pivot pins 14, and a first pivot axis P1 may virtually extend along the pair of first pivot pins 14. That is, the pair of first pivot pins 14 may define the first pivot axis P1. As the tailgate 13 pivots around the first pivot axis P1, the tailgate 13 may be opened and closed. That is, the tailgate 13 may move between an open position (see FIGS. 5, 11, and 12) and a closed position (see FIG. 1).

The cargo bed assembly 10 for a pickup truck in one form of the present disclosure may include a slide unit 30 movably received in the first cavity 21 of the truck bed 12 and a step unit 40 movably received in the second cavity 22 of the tailgate 13.

The slide unit 30 may move between a stowed position and an extended position. The "stowed position" refers to a position in which the slide unit 30 is fully stowed in the first cavity 21 of the truck bed 12, and the "extended position" refers to a position in which at least a portion of the slide unit 30 is extended from the first cavity 21 of the truck bed 12 and the second cavity 22.

The slide unit 30 may include a slide plate 31 having a front end 33 facing the front of the pickup truck and a rear end 34 facing the rear of the pickup truck, and a support plate 32 pivotally connected to the front end 33 of the slide plate 31.

The slide plate 31 may extend along the longitudinal direction of the truck bed 12. The slide plate 31 may move between the stowed position (see FIG. 1) in which the slide plate 31 is fully stowed in the first cavity 21 and the extended position (see FIGS. 8 and 9) in which the slide plate 31 is fully extended from the first cavity 21 and the second cavity 22. When the tailgate 13 is in the open position, the slide plate 31 may be fully extended from the first cavity 21 and the second cavity 22 so that the slide plate 31 may be fully deployed from the tailgate 13.

The support plate 32 may be pivotally connected to the front end 33 of the slide plate 31 through a second pivot pin 35. The second pivot pin 35 may define a second pivot axis P2, and the support plate 32 may pivot around the second pivot axis P2.

The support plate 32 may include a pair of hold mechanisms 50. When the slide plate 31 is fully extended from the first cavity 21 and the second cavity 22, the support plate 32 may be held in the second cavity 22 of the tailgate 13 by the pair of hold mechanisms 50. As the support plate 32 is held in the second cavity 22 of the tailgate 13 by the pair of hold mechanisms 50, the slide plate 31 may not be separated from the tailgate 13.

Figure 4:
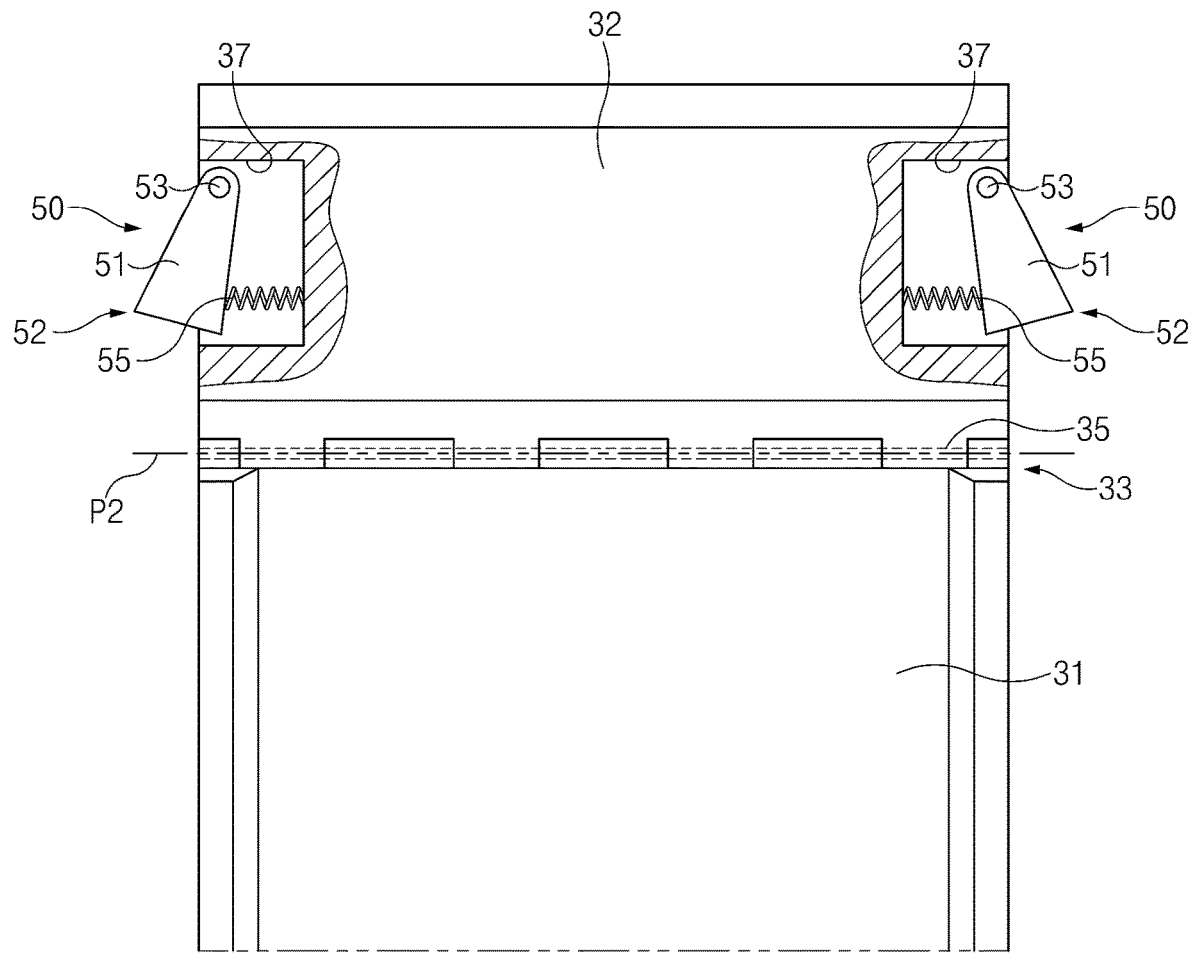
FIG. 4 illustrates a plan view of a slide plate and a support plate of the slide unit illustrated in FIG. 3.

Referring to FIG. 4, the pair of hold mechanisms 50 may be disposed on both sides of the support plate 32, respectively, and the support plate 32 may have a pair of accommodation recesses 37 opposing each other. The pair of accommodation recesses 37 may be provided in both opposing sides of the support plate 32. Each accommodation recess 37 may be recessed from each side of the support plate 32 toward the center of the support plate 32, and each hold mechanism 50 may be received in the corresponding accommodation recess 37.

The hold mechanism 50 may include a hold member 51 and a spring 55 biasing the hold member 51 outward from the support plate 32. The hold member 51 may have a wedge portion 52, and the hold member 51 may be pivotally mounted in the corresponding accommodation recess 37 through a pivot pin 53. The spring 55 may be disposed within the accommodation recess 37, and the spring 55 may push the hold member 51 from the accommodation recess 37 toward the outside of the support plate 32. When a force is applied to the hold member 51, the hold member 51 may overcome a spring force of the spring 55 and be received in the accommodation recess 37. When the force is removed, the hold member 51 may pivot by the spring 55 and the wedge portion 52 of the hold member 51 may be deployed from the accommodation recess 37 by the spring 55.

Figure 9:
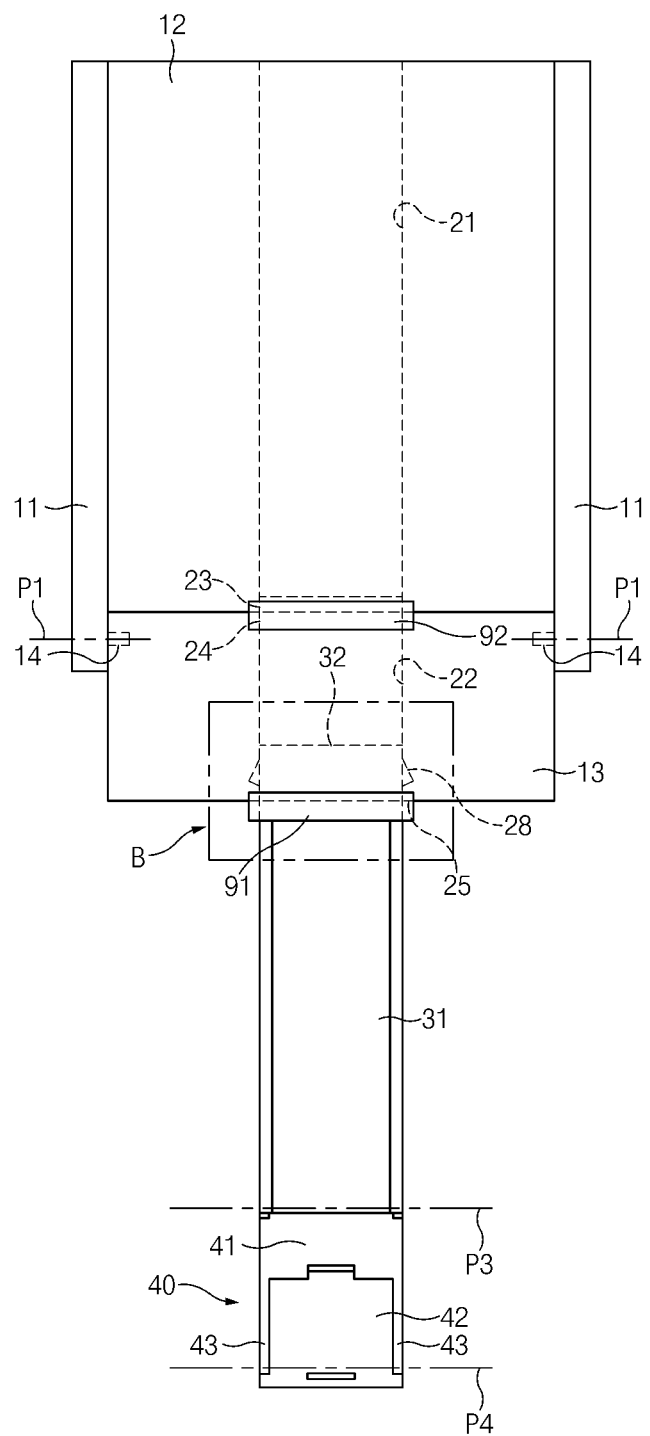
FIG. 9 illustrates a plan view of the cargo bed assembly illustrated in FIG. 8.
Figure 10:
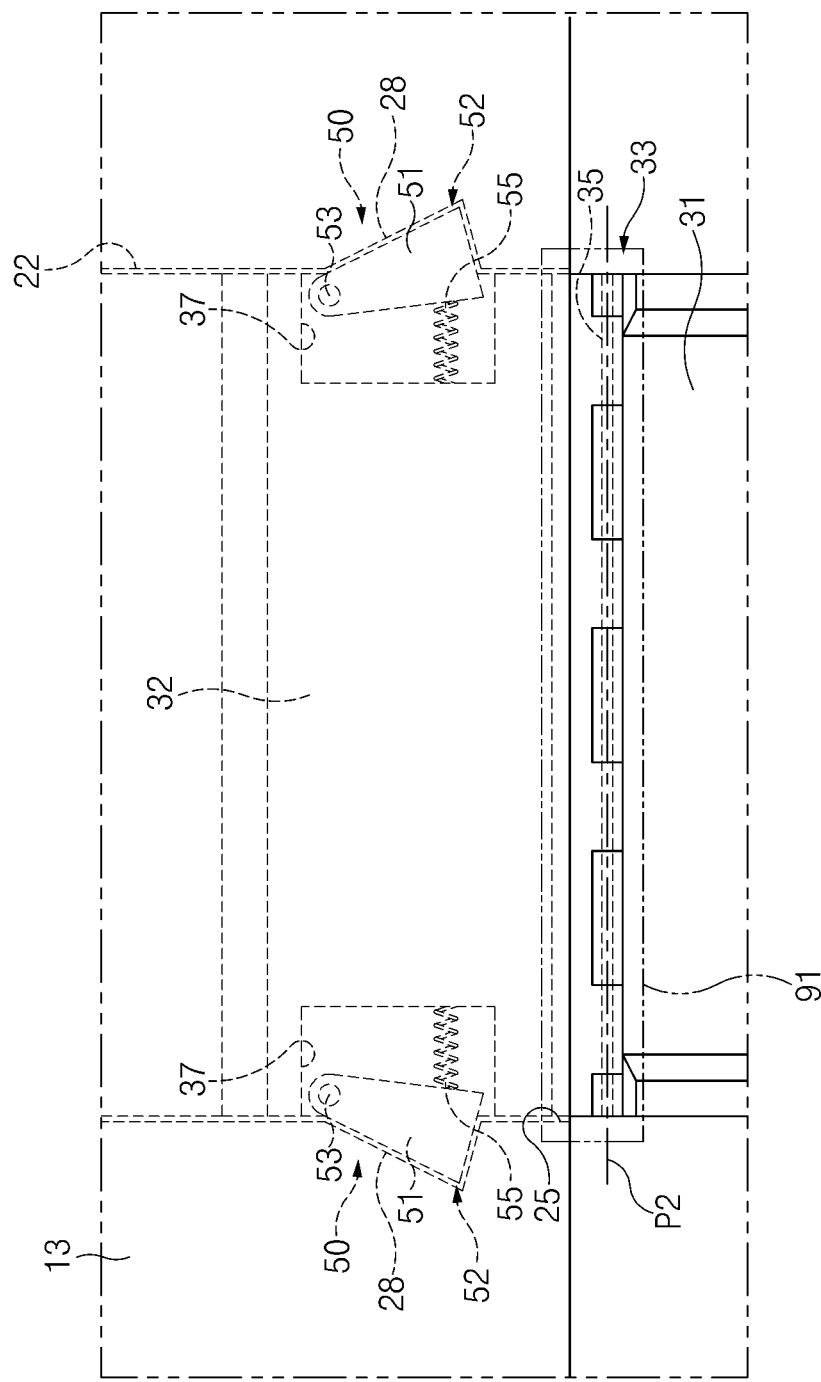
FIG. 10 illustrates an enlarged view of a portion indicated by arrow B of FIG. 9.

Referring to FIGS. 9 and 10, the tailgate 13 may have a pair of hold recesses 28 in both opposing sides of the second cavity 22. Each hold recess 28 may have a shape that matches the wedge portion 52 of the hold member 51. The pair of hold recesses 28 may be adjacent to the second opening 25 of the tailgate 13. When the slide plate 31 is fully extended from the first cavity 21 and the second cavity 22 (that is, when the slide plate 31 is deployed from the tailgate 13), each hold mechanism 50 may be aligned with the corresponding hold recess 28, and thus the force applied to the hold member 51 may be removed. As the hold mechanism 50 is aligned with the corresponding hold recess 28, the spring 55 may push the hold member 51 toward the outside of the support plate 32, and thus the hold member 51 may be deployed, and the wedge portion 52 of the hold member 51 may be fitted into the corresponding hold recess 28. As the support plate 32 is held in the tailgate 13 by the pair of hold mechanisms 50, the slide plate 31 may be supported and connected to the tailgate 13.

The step unit 40 may move between a stowed position (see FIG. 1) in which the step unit 40 is stowed in the second cavity 22 of the tailgate 13 and an extended position (see FIGS. 5 and 6) in which the step unit 40 is fully extended from the second cavity 22 of the tailgate 13.

Figure 11:
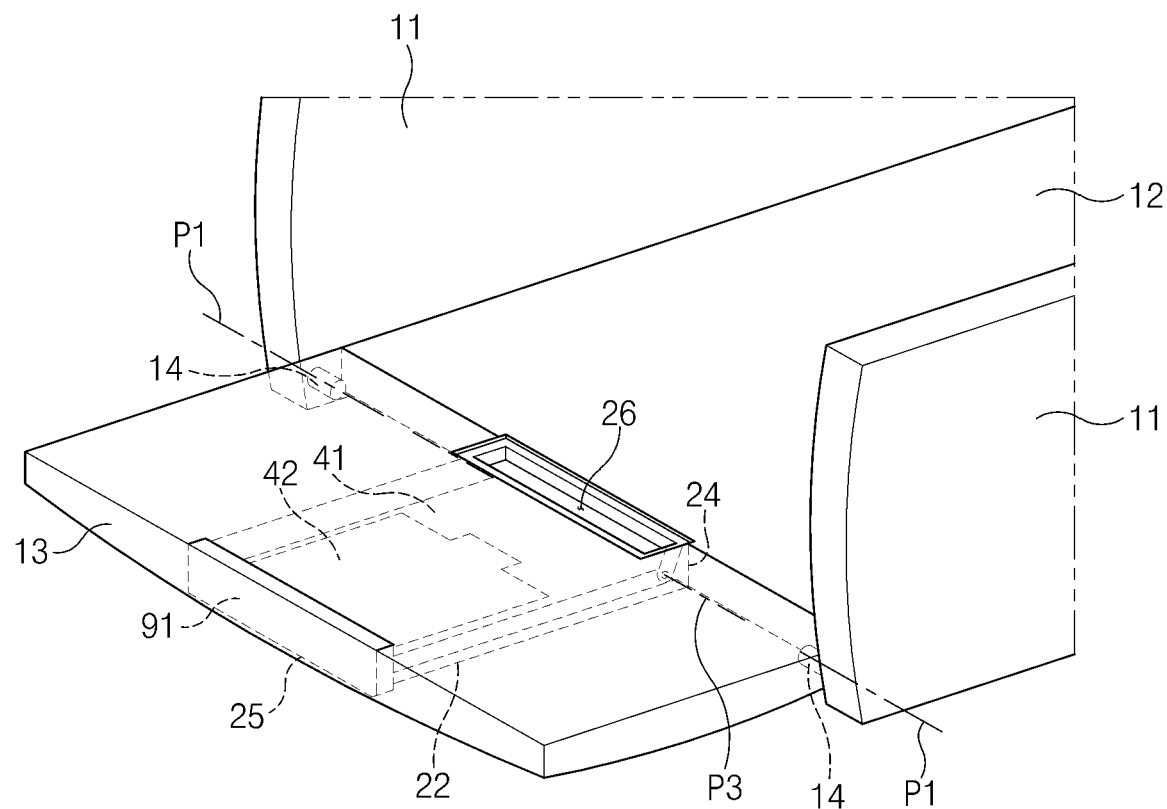
FIG. 11 illustrates a state in which a tailgate is opened, and a third opening is exposed in a cargo bed assembly for a pickup truck in one form of the present disclosure.

The step unit 40 may be pivotally connected to the rear end 34 of the slide plate 31 through a third pivot pin 36. The third pivot pin 36 may define a third pivot axis P3, and the step unit 40 may pivot around the third pivot axis P3. As illustrated in FIG. 11, when the third pivot axis P3 is aligned with (coincides with) the first pivot axis P1, the tailgate 13 may easily pivot around the first pivot axis P1, and thus the tailgate 13 may move between the open position and the closed position (that is, the tailgate 13 may be opened and closed).

Figure 15:
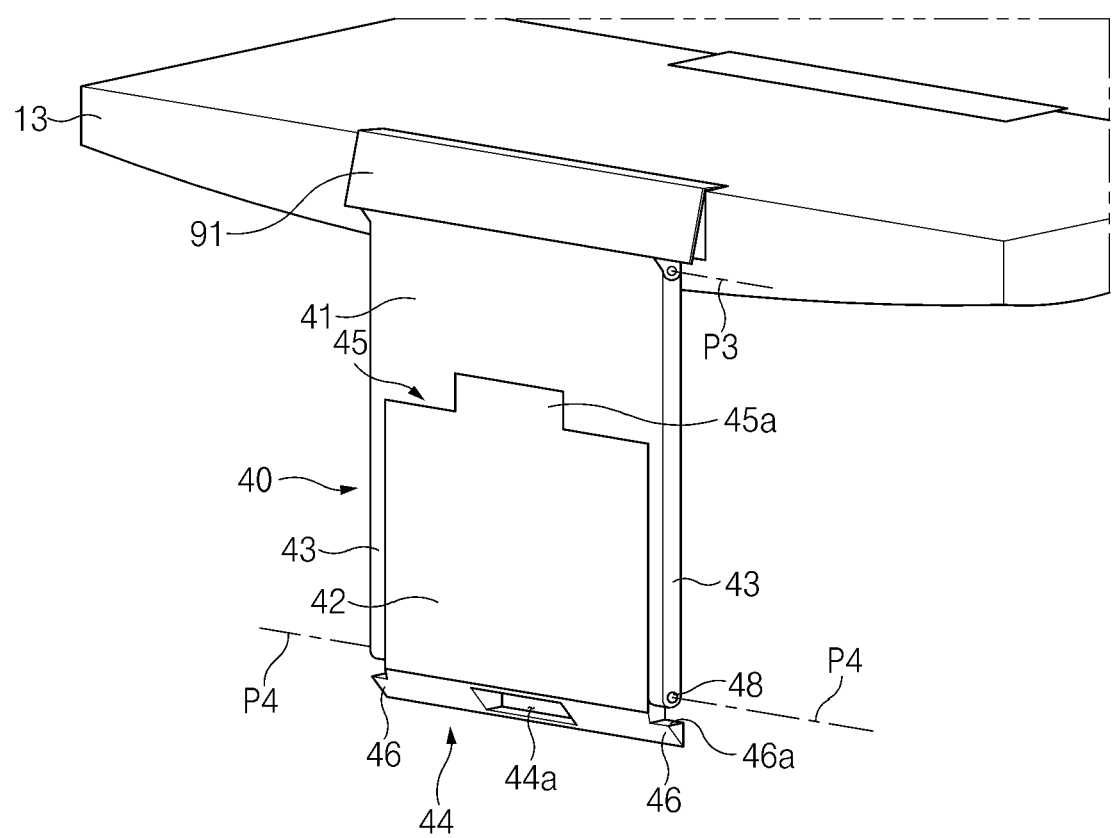
FIG. 15 illustrates a state in which the step unit illustrated in FIG. 14 pivots around a third pivot axis.
Figure 16:
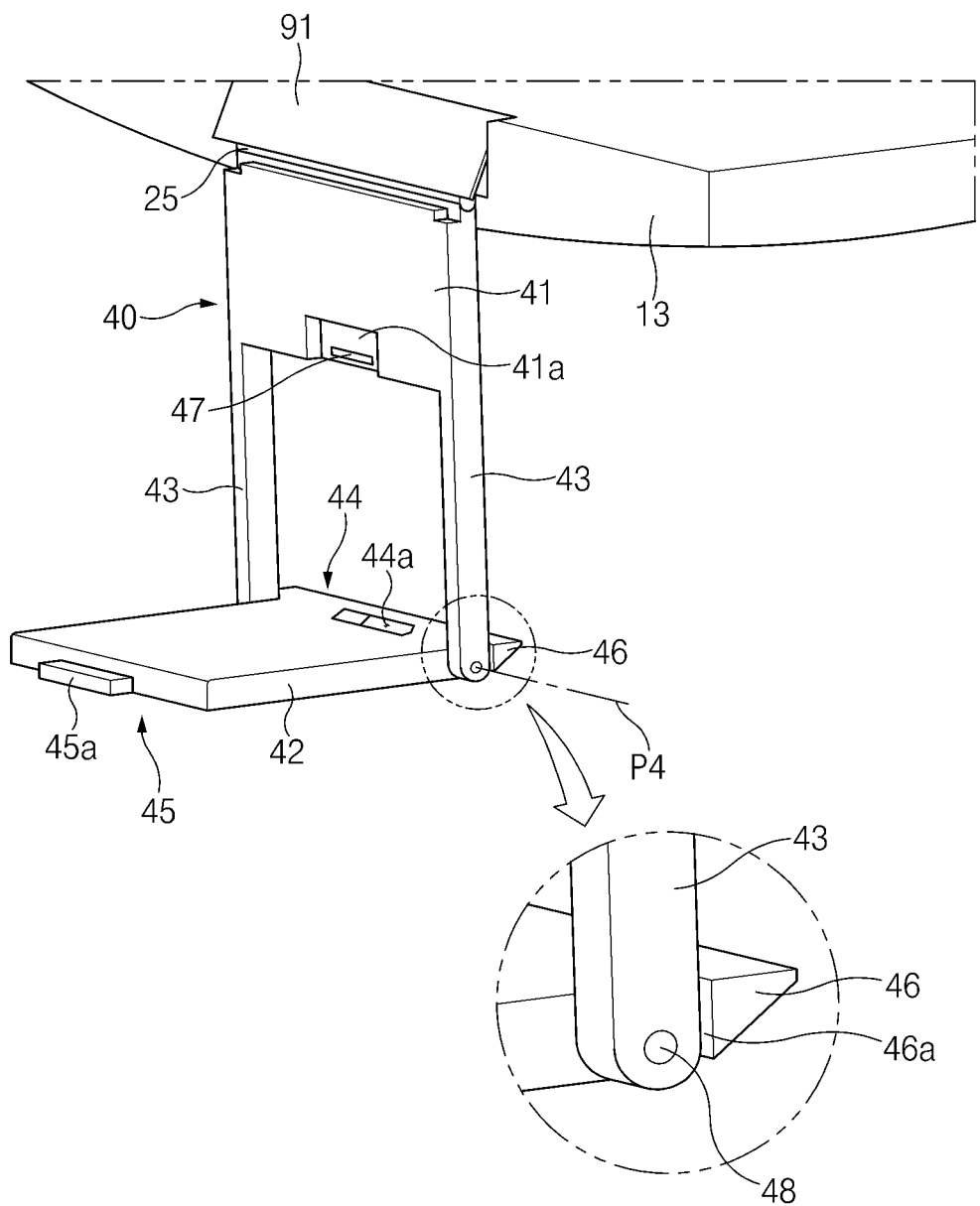
FIG. 16 illustrates a state in which a step member is unfolded from a step support in the step unit illustrated in FIG. 15.

Referring to FIGS. 2, 15, and 16, the step unit 40 may include a step support 41 pivotally connected to the rear end 34 of the slide plate 31 through the third pivot pin 36, and a step member 42 pivotally connected to the step support 41.

The step support 41 may pivot around the third pivot axis P3, and the step support 41 may have a pair of support legs 43 spaced apart from each other. The pair of support legs 43 may extend from the step support 41. The step support 41 may have a recess 41a located between the pair of support legs 43, and a magnet 47 may be mounted in the recess 41a.

The step member 42 may be pivotally connected to the pair of support legs 43 through a fourth pivot pin 48, and the fourth pivot pin 48 may define a fourth pivot axis P4. As the step member 42 pivots around the fourth pivot axis P4, the step member 42 may move between a folded position (see FIG. 15) in which the step member 42 is folded to the step support 41 and an unfolded position (see FIG. 16) in which the step member 42 is unfolded from the step support 41. The "folded position" refers to a position in which the step member 42 is folded to the pair of support legs 43 as illustrated in FIG. 15, and the "unfolded position" refers to a position in which the step member 42 is unfolded from the pair of support legs 43 as illustrated in FIG. 16.

The step member 42 may have a first end portion 44 close to the fourth pivot pin 48 and a second end portion 45 relatively far from the fourth pivot pin 48.

The first end portion 44 may have a grip recess 44a allowing a user to grip, and a pair of support protrusions 46 may be formed on opposing edges of the first end portion 44. Each support protrusion 46 may have a stopper surface 46a regulating the unfolded position of the step member 42. Referring to FIG. 16, when the step member 42 is unfolded from the step support 41, the stopper surface 46a of the support protrusion 46 may come into contact with a back surface of the corresponding support leg 43 so that the unfolded position of the step member 42 may be regulated.

The second end portion 45 may have a protrusion 45a protruding from a central portion thereof, and a magnetic body (for example, a magnet or metal) may be embedded in the protrusion 45a or attached to a surface of the protrusion 45a. As illustrated in FIG. 15, when the step member 42 is folded to the step support 41, the protrusion 45a of the second end portion 45 may be received in the recess 41a of the step support 41. In particular, the protrusion 45a provided with the magnet or metal may be firmly held in the recess 41a by a magnetic force of the magnet 47 so that the step member 42 may be held in the step support 41 in a folded state.

Figure 5:
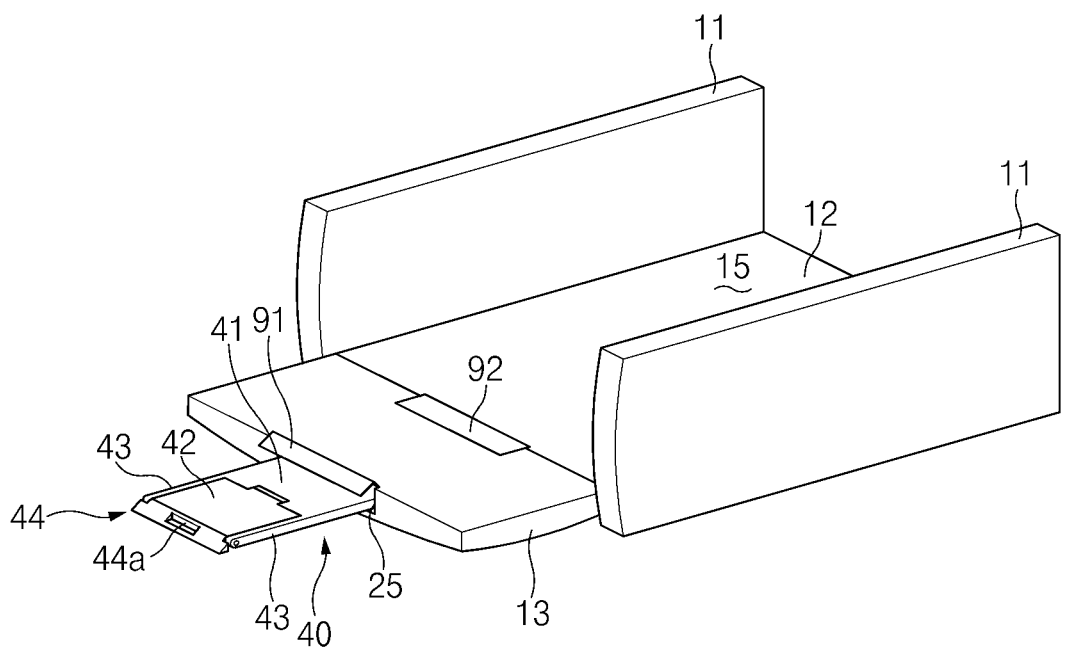
FIG. 5 illustrates an open state of a tailgate in the cargo bed assembly for a pickup truck illustrated in FIG. 3.

Referring to FIGS. 5 and 6, a first cover 91 may be pivotally mounted on the tailgate 13 to cover the second opening 25. The first cover 91 may cover the second opening 25, thereby inhibiting foreign objects/substances from entering the second opening 25.

Figure 12:
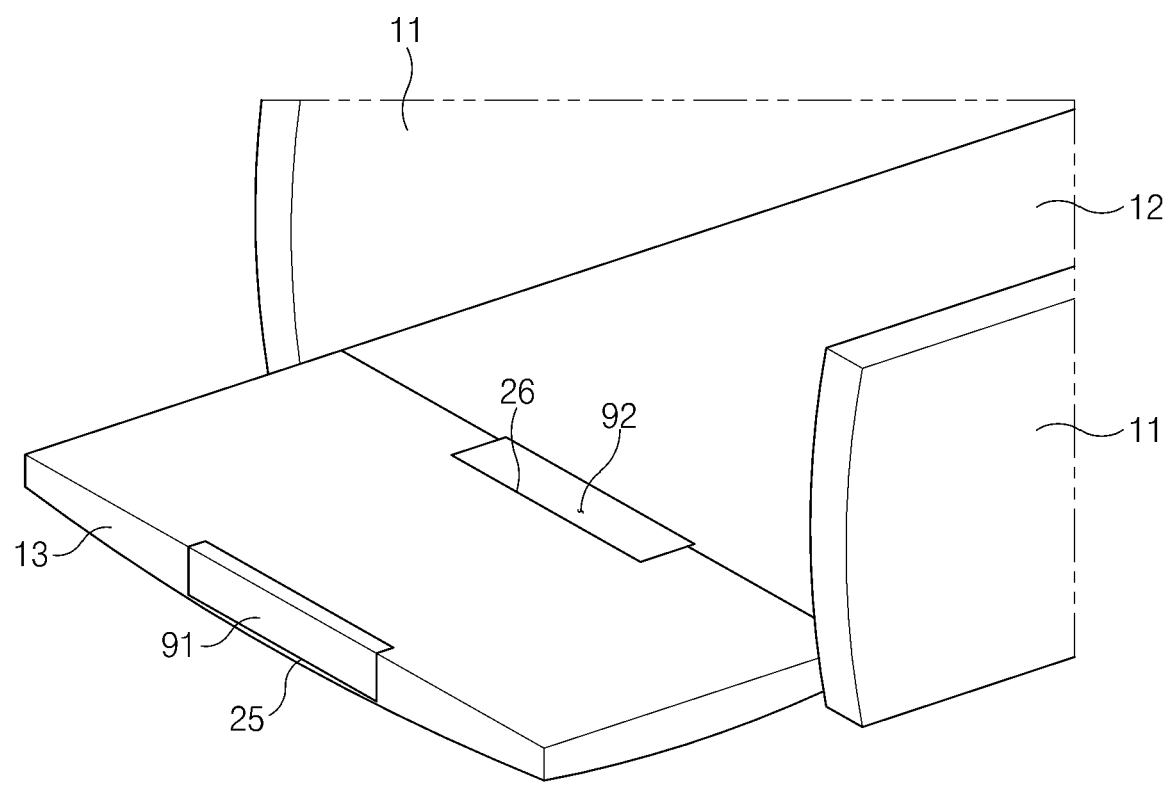
FIG. 12 illustrates a state in which a tailgate is opened, and a second cover is mounted to a third opening in a cargo bed assembly for a pickup truck in one form of the present disclosure.

Referring to FIG. 11, the tailgate 13 may have a third opening 26 adjacent to the second opening 25. When the third pivot axis P3 is aligned with the first pivot axis P1, the third pivot pin 36 and the third pivot axis P3 may be aligned with the third opening 26, and the third opening 26 may inhibit a pivot connection portion between the slide plate 31 and the step unit 40 from interfering with the tailgate 13 and/or the truck bed 12, and thus the pivoting of the step unit 40 and the pivoting of the tailgate 13 may be made smoothly. Referring to FIG. 12, a second cover 92 may be pivotally mounted on a portion of the truck bed 12 adjacent to the third opening 26, and the second cover 92 may cover the third opening 26, thereby inhibiting foreign objects/substances from entering the third opening 26.

Referring to FIG. 1, when the tailgate 13 is in the closed position, the slide plate 31 and the support plate 32 may be fully stowed in the first cavity 21 of the truck bed 12, and the step unit 40 may be fully stowed in the second cavity 22 of the tailgate 13.

Figure 7:
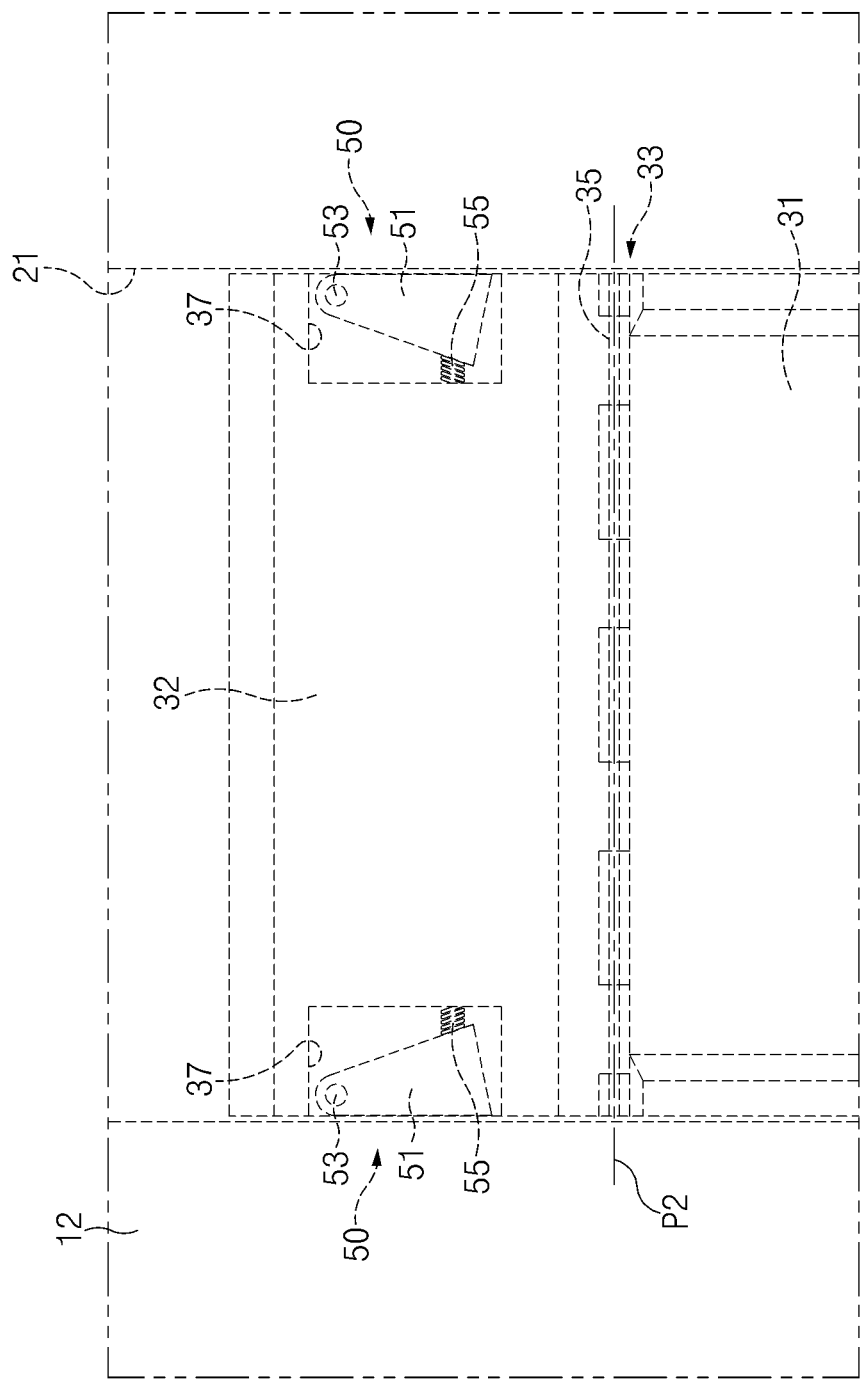
FIG. 7 illustrates an enlarged view of a portion indicated by arrow A of FIG. 6.
Figure 8:
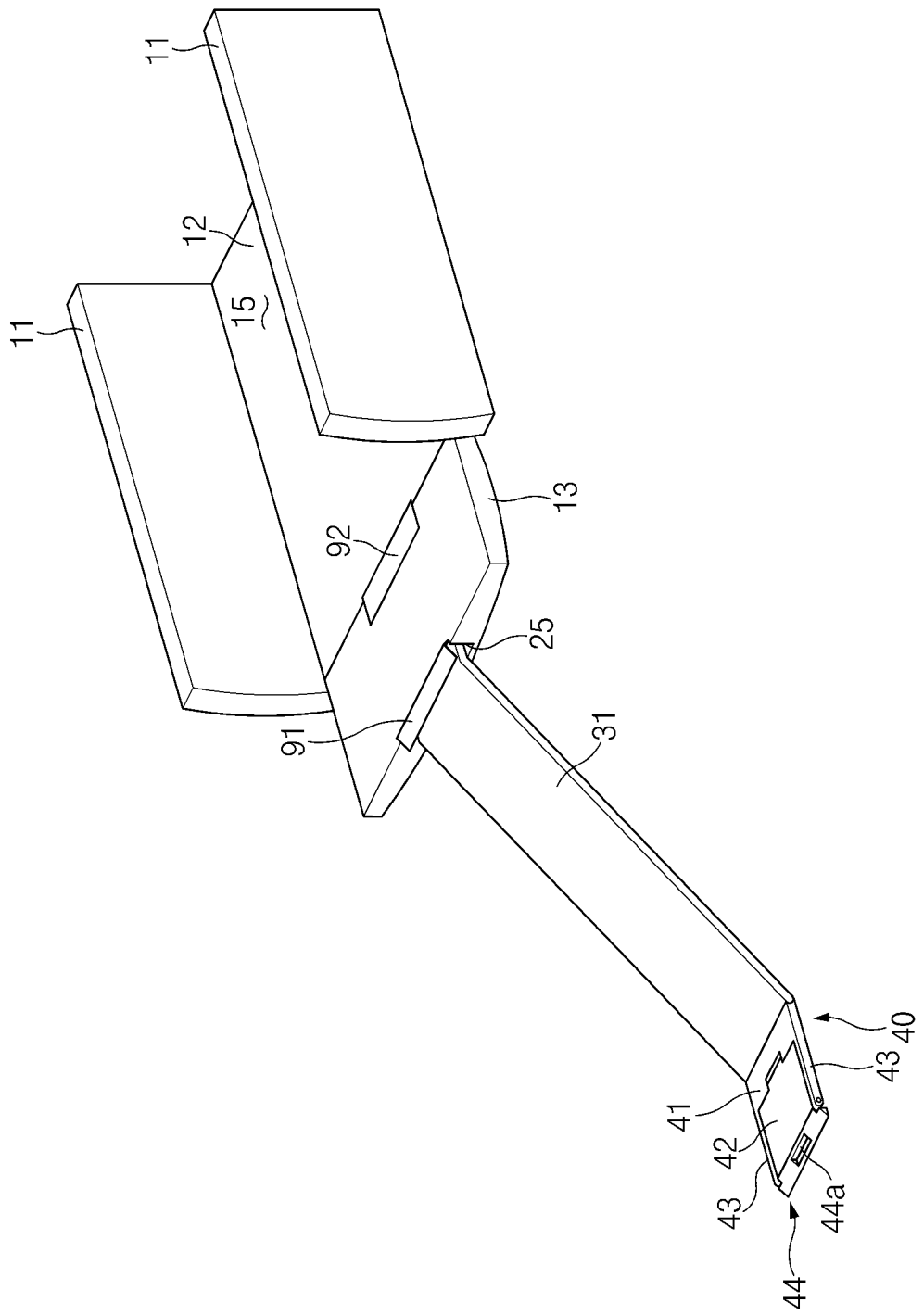
FIG. 8 illustrates a state in which a tailgate is opened, and a slide plate and a step unit are fully extended from a second cavity of the tailgate in a cargo bed assembly for a pickup truck in one form of the present disclosure.

FIGS. 5 to 10 illustrate a process in which the slide plate 31 and the step unit 40 are fully extended from the second cavity 22 of the tailgate 13, and the step unit 40 contacts the ground. As illustrated in FIGS. 5 and 6, the tailgate 13 may move to the open position, and the step unit 40 and the slide plate 31 may move toward the rear of the pickup truck so that the step unit 40 and the slide plate 31 may be extended from the second cavity 22 of the tailgate 13. Referring to FIG. 7, when the support plate 32 moves within the first cavity 21 or the second cavity 22, the hold member 51 of each hold mechanism 50 may contact an internal surface of the first cavity 21 or an internal surface of the second cavity 22 so that the hold member 51 may be received in the accommodation recess 37 of the support plate 32. The support plate 32 may move toward the rear of the pickup truck along the first cavity 21 and the second cavity 22. As the slide plate 31 is fully moved toward the rear of the pickup truck along the first cavity 21 of the truck bed 12 and the second cavity 22 of the tailgate 13, the step unit 40 and the slide plate 31 may be fully extended from the second cavity 22 of the tailgate 13 as illustrated in FIGS. 8 and 9. Referring to FIGS. 9 and 10, when the pair of hold mechanisms 50 are aligned with the pair of hold recesses 28 of the tailgate 13, the hold member 51 of each hold mechanism 50 may be fitted into the hold recess 28 of the tailgate 13 by the spring 55, and thus the support plate 32 may be held in the tailgate 13, and the slide plate 31 may be supported and connected to the tailgate 13. Referring to FIG. 8, in a state in which the step unit 40 and the slide plate 31 are fully extended from the second cavity 22 of the tailgate 13, the slide plate 31 may pivot around the second pivot axis P2 with respect to the support plate 32, the step unit 40 may pivot around the third pivot axis P3 with respect to the slide plate 31, and the step unit 40 may contact the ground. The slide plate 31 may be inclined between the tailgate 13 and the ground, thereby facilitating the loading and unloading of large cargo such as large equipment and motorcycles.

Figure 13:
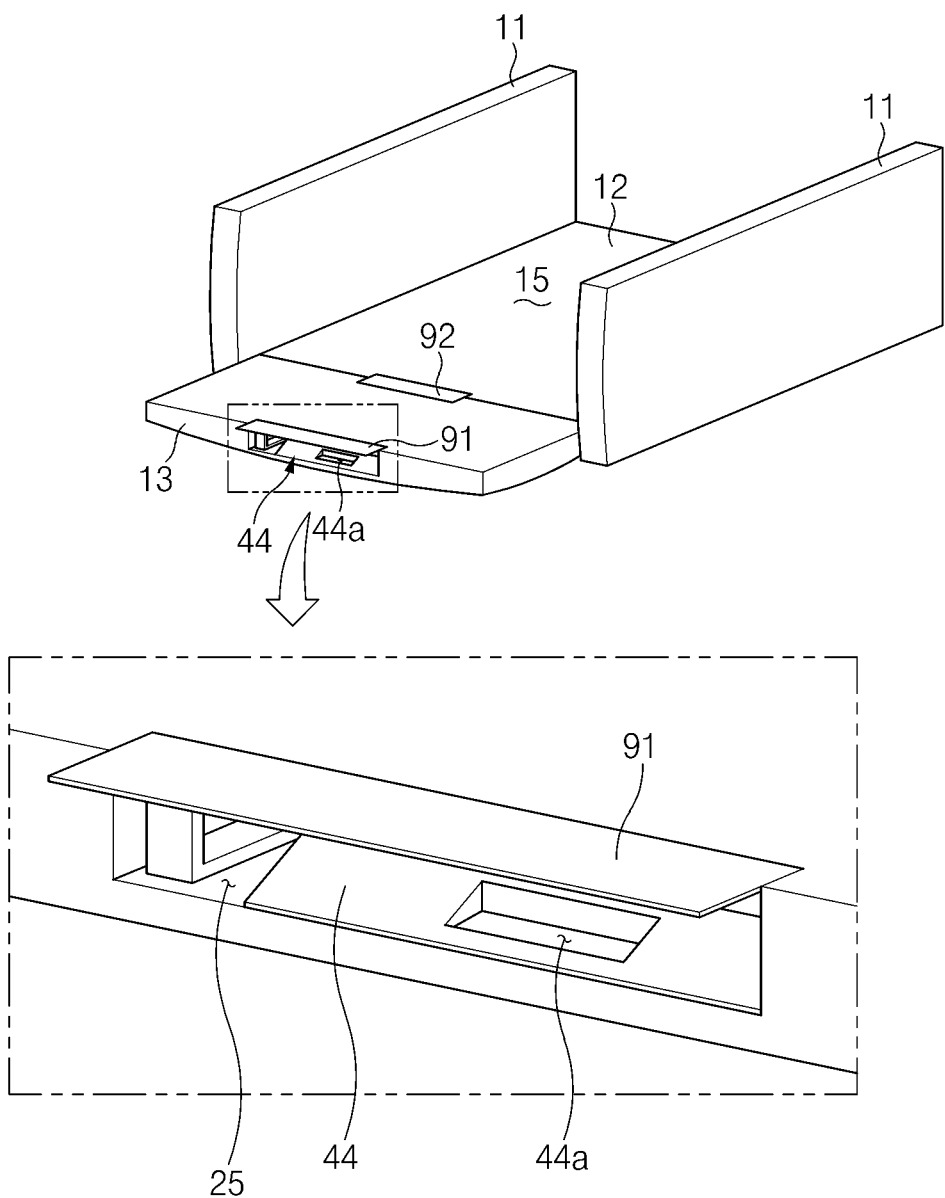
FIG. 13 illustrates a state in which a tailgate is opened, and a first cover uncovers a second opening in a cargo bed assembly for a pickup truck in one form of the present disclosure.
Figure 14:
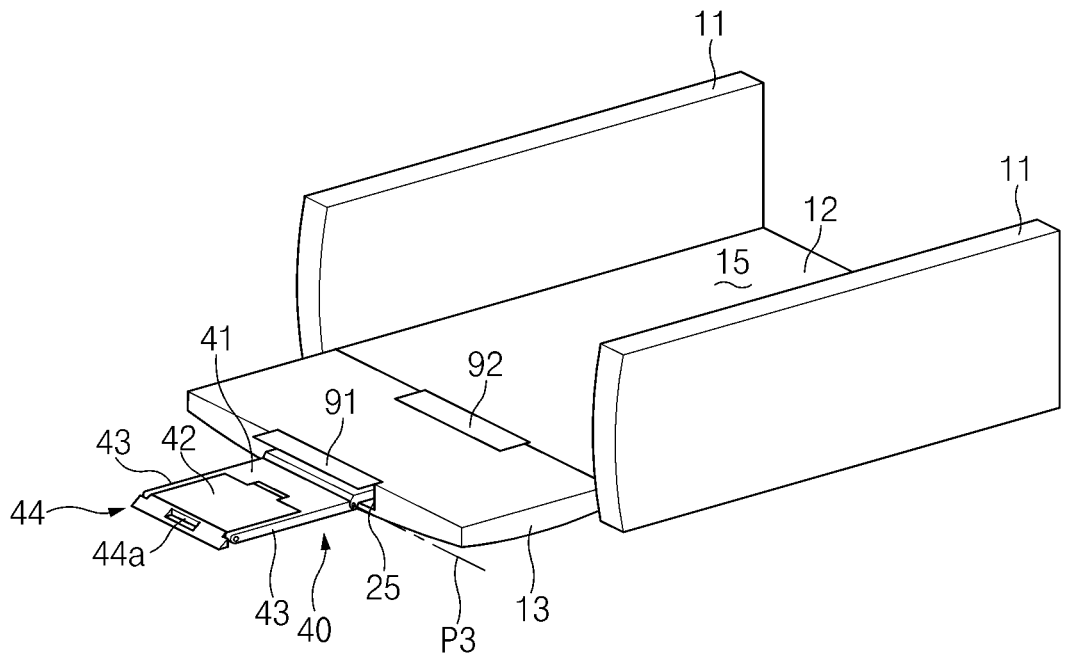
FIG. 14 illustrates a state in which a tailgate is opened, and a step unit is fully extended from a second cavity of the tailgate in a cargo bed assembly for a pickup truck in one form of the present disclosure.

FIGS. 13 to 16 illustrate a process in which only the step unit 40 is fully extended from the second cavity 22 of the tailgate 13, and the step member 42 is unfolded from the step support 41. As illustrated in FIG. 13, as the tailgate 13 moves to the open position, and the first cover 91 is opened, the grip recess 44a of the step unit 40 may be exposed. As illustrated in FIG. 14, the step unit 40 may be fully extended from the second cavity 22 of the tailgate 13, and the third pivot pin 36 and the third pivot axis P3 may be exposed from the second opening 25. As illustrated in FIG. 15, the step support 41 of the step unit 40 may pivot around the third pivot axis P3. As illustrated in FIG. 16, the step member 42 may be unfolded from the step support 41 so that the step member 42 may be perpendicular to the step support 41. In the state illustrated in FIG. 16, an operator may easily load relatively small cargo into the cargo compartment 15.

As the step unit 40 and/or the slide plate 31 move toward the front of the pickup truck, the slide plate 31 may be fully stowed in the first cavity 21, and the step unit 40 may be fully stowed in the second cavity 22. Thereafter, in a state in which the third pivot axis P3 is aligned with the first pivot axis P1 as illustrated in FIG. 11, the tailgate 13 may be closed.

As set forth above, the cargo bed assembly for a pickup truck, in one form of the present disclosure, may include the slide unit and the step unit pivotally connected to the slide unit which are movably received in the first cavity of the truck bed and the second cavity of the tailgate, thereby securing convenience and safety in the ingress and egress of passengers, small cargo, large cargo, equipment, etc.

In one form of the present disclosure, as the slide unit and the step unit for assisting in the ingress and egress of passengers and cargo are movably received in the truck bed and the tailgate, the volume of the cargo compartment may be sufficiently secured, and space utilization of the cargo compartment may be improved.

In one form of the present disclosure, as the slide unit and the step unit are fully stowed in the first cavity of the truck bed and the second cavity of the tailgate, they may not affect exterior styling. Thus, the degree of freedom of design may be increased.

In one form of the present disclosure, no additional equipment for ingress and egress of passengers and cargo may be desired, and thus user convenience may be improved.

Hereinabove, although the present disclosure has been described with reference to various forms and the accompanying drawings, the present disclosure is not limited thereto, but may be variously modified and altered by those skilled in the art to which the present disclosure pertains without departing from the spirit and scope of the present disclosure.

What is claimed is:

1. A cargo bed assembly for a pickup truck, the cargo bed assembly comprising:
   a pair of sidewalls opposing each other;
   a truck bed located between the pair of sidewalls, and having a first cavity;
   a tailgate pivotally connected to a rear end of the truck bed by a first pivot pin, and having a second cavity;
   a slide unit movably received in the first cavity; and
   a step unit movably received in the second cavity,
   wherein:
     the second cavity is configured to communicate with the first cavity, and
     the step unit is pivotally connected to the slide unit.

2. The cargo bed assembly according to claim 1, wherein the slide unit includes:
   a slide plate having a front end facing a front of the pickup truck and a rear end facing a rear of the pickup truck, and
   a support plate pivotally connected to the front end of the slide plate by a second pivot pin.

3. The cargo bed assembly according to claim 2, wherein the slide plate is configured to move between a stowed position in which the slide plate is stowed in the first cavity and an extended position in which the slide plate is extended from the first cavity and the second cavity.

4. The cargo bed assembly according to claim 3, wherein the support plate is held in the tailgate by a pair of hold mechanisms when the slide plate is fully extended from the first cavity and the second cavity.

5. The cargo bed assembly according to claim 4, wherein:
the support plate includes a pair of accommodation recesses provided in both opposing sides thereof, and
each hold mechanism of the pair of hold mechanisms is received in a corresponding accommodation recess among the pair of accommodation recesses.

6. The cargo bed assembly according to claim 5, wherein each hold mechanism of the pair of hold mechanisms includes a hold member pivotally mounted in the corresponding accommodation recess and a spring biasing the hold member outward from the support plate.

7. The cargo bed assembly according to claim 6, wherein:
the tailgate has a pair of hold recesses provided in both opposing sides of the second cavity, respectively, and
the hold member is fitted into a corresponding hold recess by the spring.

8. The cargo bed assembly according to claim 2, wherein the step unit is configured to move between a stowed position in which the step unit is stowed in the second cavity and an extended position in which the step unit is fully extended from the second cavity.

9. The cargo bed assembly according to claim 8, wherein the step unit includes a step support pivotally connected to the rear end of the slide plate by a third pivot pin, and a step member pivotally connected to the step support.

10. The cargo bed assembly according to claim 9, wherein:
the step support includes a pair of support legs spaced apart from each other, and
the pair of support legs extend from the step support.

11. The cargo bed assembly according to claim 10, wherein:
the step member is pivotally connected to the pair of support legs by a fourth pivot pin, and
as the step member pivots, the step member is configured to move between a folded position in which the step member is folded to the step support and an unfolded position in which the step member is unfolded from the step support.

12. The cargo bed assembly according to claim 11, wherein:
the step member has a first end portion close to the fourth pivot pin and a second end portion further away from the fourth pivot pin compared to the first end portion,
the first end portion has a grip recess,
a pair of support protrusions are provided on opposing edges of the first end portion, and
each support protrusion of the pair of support protrusions has a stopper surface configured to regulate the unfolded position of the step member.

13. The cargo bed assembly according to claim 12, wherein:
the step support has a recess located between the pair of support legs,
the second end portion has a protrusion, and
the protrusion of the second end portion is received in the recess of the step support when the step member is in the folded position.

14. The cargo bed assembly according to claim 1, wherein:
the tailgate includes a first opening and a second opening configured to communicate with the second cavity,
the first opening and the second opening are provided in both opposing ends of the second cavity, respectively,
the first opening faces the first cavity,
the second opening faces an outside of the pickup truck, and
a first cover is pivotally mounted to the second opening.

15. The cargo bed assembly according to claim 14, wherein the tailgate further includes a third opening adjacent to the second opening, and
a second cover is pivotally mounted to the third opening.

* * * * *